W. C. MANGEL.
TRAILER CONNECTION.
APPLICATION FILED JAN. 27, 1919.
1,391,962.
Patented Sept. 27, 1921.
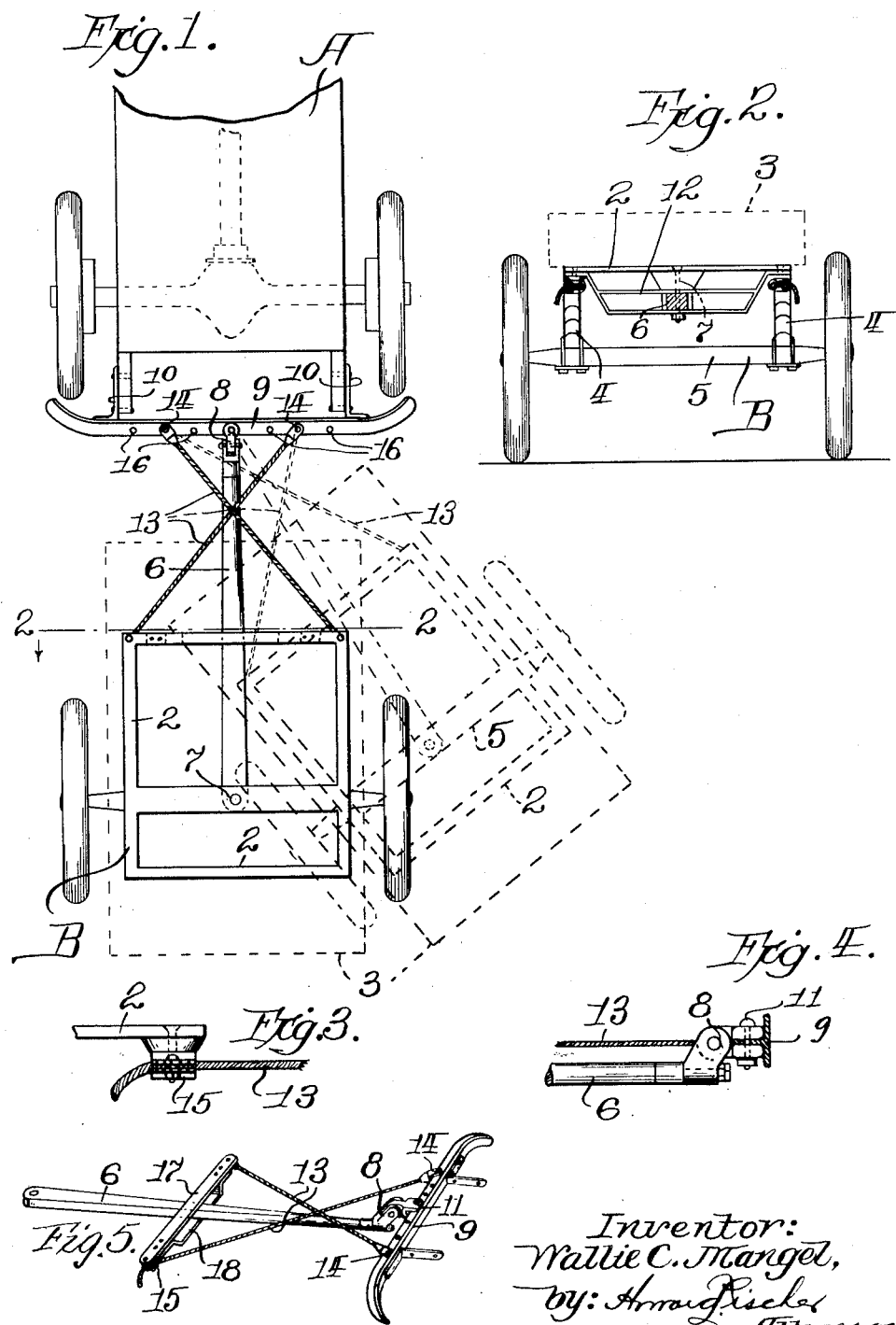

UNITED STATES PATENT OFFICE.

WALLIE C. MANGEL, OF FAIRFAX, MINNESOTA.

TRAILER CONNECTION.

1,391,962.        Specification of Letters Patent.        Patented Sept. 27, 1921.

Application filed January 27, 1919. Serial No. 273,659.

*To all whom it may concern:*

Be it known that I, WALLIE C. MANGEL, a citizen of the United States, residing at Fairfax, in the county of Renville and State of Minnesota, have invented a new and useful Improvement in Trailer Connections, of which the following is a specification.

My invention relates to trailers, being of a type which are particularly adapted to be used in connection with motor vehicles of a suitable nature, and primarily a particular connecting means for a two-wheeled trailer so that the same can be freely and easily guided back of the motor vehicle, either when going in a forward direction or when reversed.

The extensive use of trailers at this time, in connection with motor vehicles, has made a large demand for a device which is simple and practical, and one of the most objectionable features of the ordinary trailer has been that it could not be easily steered, especially in backing up, and while some devices have been used for steering trailers, they apparently have lacked the simplicity and practical features which are essential in a connection for any trailer. An important feature of my construction of device is in the use of a connection which is capable of forming a bumper on the motor vehicle when it is not desired to use the trailer with the same, and on the other hand, the trailer can be easily and adjustably attached to the bumper element when it is desired to use the trailer in connection with a motor vehicle. This construction is very desirable, as the connecting means for the trailer forms a useful element in place of some unsightly trailer connection.

The ordinary two-wheeled trailer of present construction, where the tongue is rigidly connected to the trailer chassis or box, can be readily converted into a trailer of a characted of my trailer by removing the trailer tongue and then securing one end of the same pivotally to the trailer and swivelly connecting the forward end of the tongue to the connecting element on the motor vehicle. Then by attaching a suitable guide to the trailer body or running gear, and connecting flexible cross cables or rods to the trailer and to the connecting element, which is rigidly secured to the motor vehicle.

In the drawing forming part of this specification:

Figure 1 is a plan view of a portion of a motor vehicle, illustrating a trailer connected to the same having my connecting means, a portion of the trailer being illustrated in dotted outline and the trailer being illustrated in dotted outline in the position it would assume when the motor vehicle is traveling forward or backward on a curve.

Fig. 2 is a front elevation on the line 2—2 of Figure 1, a portion of which is illustrated in cross section and dotted outline.

Figs. 3 and 4 are details of a portion of the connecting means of the trailer.

Fig. 5 is a diagrammatic view in perspective of the necessary elements for connecting the trailer to the motor vehicle so that it can be steered when attached to the same.

In the drawing, A represents a motor vehicle, only the rear portion of which is illustrated in the drawing, which is adapted to draw a trailer, such as B, the construction of which is the two-wheeled type and the frame 2, which is adapted to carry the body 3, is rigidly connected to the chassis of the trailer. The body 3 is illustrated in dotted outline in the drawing. It is desirable to use a two-wheeled trailer for light loads in connection with motor vehicles, it being more economical than a four-wheeled type, and the only thing which has been detrimental in the present two-wheeled type trailers, has been the steering of the same, it being very inconvenient and practically impossible to back up with the ordinary construction of two-wheeled trailers.

In the construction of the trailer B, as illustrated in Figs. 1 and 2, the springs 4 are rigidly attached to the axle 5, and the springs 4 are connected pivotally to the frame 2, in the ordinary manner. The trailer tongue 6 is pivotally connected on one end at 7, preferably in line with the axle 5, and the forward end of the tongue is pivotally and swivelly connected by means of the connection 8 to the bumper element 9. The bumper element 9 is rigidly connected by arms 10 to the frame of the motor vehicle A in a suitable manner, and in a convenient position, so as to perform the functions of a connection for the trailer B and to act as a bumper or guard for the rear portion of the motor vehicle A when the trailer tongue is disengaged from the member 9, by disengaging the bolt 11 from the member 9. The connection 8 is centrally connected to the member 9 so as to position the trailer B directly in line with the motor vehicle. A suitable guide 12 is formed and attached to the forward end of the frame 2, through which the tongue 6 is adapted to extend, to allow free lateral movement of the tongue or pole 6 in the guide 12, but to hold the frame 2 of the trailer against vertical movement in relation to the tongue. In this manner, the forward end of the trailer B is balanced by the tongue 6. The connecting member 8 swively connects the forward end of the tongue 6 to the member 9, and can be of any suitable construction to allow the trailer free movement in various directions when being drawn by the motor vehicle A.

Flexible connecting elements 13 are pivotally connected on their forward ends by a suitable connection at 14 at a position on either side of the connection 8, and the rear portion of the cables or flexible elements 13 extend so as to cross each other, as illustrated in Fig. 1, and are pivotally and adjustably held to the frame 2 by means of clamps 15. The clamps 15 allow the lateral movement and pivoting of the rear portions of the elements or cables 13 and also allow the slack to be readily taken out of the cables so that they can be adjusted to the desired length. It is an important feature that the cables 13 be adjustable in length so as to hold the trailer in the desired position back of the motor vehicle and cause it to be steered or drawn in line with the travel of the motor vehicle. The elements 13 form the steering means so as to cause the trailer to turn or move into the desired position to allow the motor vehicle A to move in a forward or backward direction and steer the trailer B into any desired position. When the motor vehicle A moves in either direction, the tongue 6 is adapted to move laterally between its pivoted end in the guide 12, and the flexible steering elements 13 cause the chassis of the trailer to move in the desired position to cause the trailer to freely and easily be guided by the motor vehicle A.

The forward ends of the steering elements 13 are adjustable on the member 9 by pivotally connecting the same in the various holes 16. By changing the position of the pivot points of the forward end of the steering elements 13 on the member 9, the trailer can be caused to turn quicker or slower, as may be desired, during the operation of the motor vehicle A. It is evident that the farther the pivot points of the forward ends of the elements 13 are spaced from the connection 8 of the tongue, the quicker the elements 13 will act in guiding or steering the trailer in either direction, when being drawn by the motor vehicle A. For this reason, it is very important that the forward ends of the steering members 13 are adjustable laterally on the connecting member 9, and by means of the clamps 15, the length of the elements 13 can be readily adjusted, thus giving a very practical and convenient steering device for the trailer B.

The crossed steering elements 13 could be in the form of rods, in place of the flexible members 13. When it is desired to use the motor vehicle A without the trailer B, the elements 13 are disconnected from the points 14, and the connection 8 of the tongue 6 is disconnected from the member 9 by removing the bolt 11. The member 9 then forms a suitable guard or bumper means for the auto or motor vehicle A, a feature which is very desirable on any automobile and is not an unsightly affair, as is usually true of ordinary trailer connections on a motor vehicle. This is an essential feature of my invention.

In the diagrammatic illustration in Fig. 5, the tongue or pole 6 is illustrated with its connection 8 secured to the bumper or guard element 9, and the cable or steering members 13 having their forward ends pivotally secured at 14 to the member 9 with their rear portion held by suitable clamps, such as 15, to a transversely extending member 17. The member 17 is adapted to perform the same functions as the guide 12, in relation to the tongue 6, being formed with a guide-way 18 in which the tongue 6 may freely move laterally when these elements are in use. These elements, as illustrated diagrammatically, are the essential ones which are necessary in the operation and steering of a two-wheeled trailer, as heretofore described. The ordinary trailer with a pole or tongue which is rigidly attached to the body or frame of the trailer can be easily and quickly converted into a trailer having a connection and of a construction, as illustrated in Fig. 1. By removing the pole or tongue from the trailer and attaching a member, such as 17, to the bottom of the box or to the frame of the trailer, and pivotally connecting the rear end of the pole in a suitable manner, while the forward end can be equipped with a swivel connection, such as 8, so that it can be attached to a connecting member, such as 9; then by the flexible crossed steering members, the member 9 and the member 17 are connected, as illustrated in Fig. 5, the member 9 being rigidly attached to the motor vehicle with which the trailer is going to be used. The member 17 holds the tongue so as to balance the trailer when it is connected to the motor vehicle, and the pull or push being taken care of by the tongue, while the members 13 act as the steering elements to guide the trailer in the desired direction.

The flexible steering elements 13 allow a free movement between the motor vehicle A and the trailer B so as not to cause any binding on the connecting parts, and to allow the trailer wheels to pass freely over any irregular road on which it is being drawn and the steering elements 13 will prevent any switching or side-thrust of the trailer and cause the wheels of the same to follow in the tracks or in line with the wheels of the motor vehicle. By means of my peculiar construction of connection, the two-wheeled trailer can be made practical for use in connection with motor vehicles and I believe that the objectionable features, which have been heretofore experienced with two-wheeled trailers, are completely overcome.

It is an important feature of my invention that the load or pull and push of the trailer, together with the balancing of the same, be taken care of by the tongue 6, thus preventing any strain on the other connecting parts and giving a more durable construction, allowing the steering elements to operate freely. In the use of the flexible connections or steering elements 13, when turning in one direction, one of the elements will be drawn taut, while the other is somewhat loose and vice versa, when turning in the other direction.

In accordance with the patent statutes I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims:

1. In a trailer for vehicles, the combination with a bumper secured to and extending beyond the rear end of an automobile chassis, of a rigid tongue pivotally secured by one end centrally to the trailer and its free end being adjustably and swivelly connected to the bumper, and flexible steering connections between said trailer and bumper.

2. The combination with a bumper secured to and extending beyond the rear end of a vehicle chassis, of a wheeled trailer, comprising a tongue pivoted at one end to the trailer, a transverse guide embracing said tongue secured to and depending from the under side of the trailer, means for pivotally and adjustably connecting the free end of the tongue to the bumper, and a flexible steering means connected to the guide and bumper for the purpose specified.

3. The combination with the chassis of a motor vehicle, of a bumper secured to and extending rearwardly beyond the rear end of said chassis and having a plurality of spaced openings therein, a trailer, a tongue having one end pivotally secured to the trailer, means pivotally connecting the free ends of said tongue centrally to the bumper, a guide secured to and depending from the trailer and embracing said tongue, clamps secured to the opposite ends of said guide, flexible steering means having one of their ends secured in the openings of the bumper and their free ends secured to the clamps of the guide, said clamps and openings of the bumper constituting a means whereby the steering connections may be adjusted.

WALLIE C. MANGEL.